(12) United States Patent
Edvardsson

(10) Patent No.: US 6,795,015 B2
(45) Date of Patent: Sep. 21, 2004

(54) BOTTOM REFLECTOR FOR A RADAR-BASED LEVEL GAUGE

(75) Inventor: Kurt Olov Edvardsson, Täby (SE)

(73) Assignee: Saab Rosemount Tank Radar AB, Gothenburg (SE)

( * ) Notice: Subject to any disclaimer, the term of this patent is extended or adjusted under 35 U.S.C. 154(b) by 0 days.

(21) Appl. No.: 10/353,836

(22) Filed: Jan. 29, 2003

(65) Prior Publication Data

US 2004/0145510 A1 Jul. 29, 2004

(51) Int. Cl.[7] .......................... G01S 13/08; G01F 23/00
(52) U.S. Cl. ...................... 342/124; 342/5; 342/118; 73/290 R; 73/290 V
(58) Field of Search .......................... 342/118–124; 73/290 R, 290 B, 290 V, 304 R, 304 C, 305–322, 322.5; 324/644; 340/618

(56) References Cited

U.S. PATENT DOCUMENTS

| | | | |
|---|---|---|---|
| 4,641,139 A | | 2/1987 | Edvardsson .................. 342/124 |
| 5,309,763 A | * | 5/1994 | Sinclair ..................... 73/290 V |
| 5,504,490 A | * | 4/1996 | Brendle et al. ............. 342/118 |
| 6,539,794 B1 | * | 4/2003 | Otto et al. ................. 73/290 V |

FOREIGN PATENT DOCUMENTS

| | | |
|---|---|---|
| JP | 10-142029 | 5/1998 |
| WO | WO 98/24013 | 6/1998 |

OTHER PUBLICATIONS

Handbook of Antenna Design, vol. 1 and 2, editors A.W. Rudge et al., Peter Peregrinus Ltd., 1986, pp. 184–185.

Antenna Engineering Handbook, 3rd Edition, editor R.C. Johnson, McGraw–Hill, Inc., 1993, pp. 17–28 –17–29.

* cited by examiner

Primary Examiner—John B. Sotomayor
Assistant Examiner—Isam Alsomiri
(74) Attorney, Agent, or Firm—Westman, Champlin & Kelly, P.A.

(57) ABSTRACT

A bottom reflector for a radar-based level gauge, which measures a level of a liquid stored in a tank by means of transmitting a microwave signal towards the surface of the liquid from the top of the tank, receiving the microwave signal as reflected against the surface of the liquid, and calculating the level of the liquid from the propagation time of the transmitted and reflected microwave signal, wherein the bottom reflector is adapted to be mounted close to the bottom of the tank and comprises a reflecting structure having a first reflection coefficient for the microwave signal when the level of the liquid is above the reflecting structure and a second reflection coefficient for the microwave signal when the level of the liquid is below the reflecting structure, wherein the first reflection coefficient is substantially lower than the second reflection coefficient.

54 Claims, 11 Drawing Sheets

BOTTOM REFLECTOR FOR A RADAR-BASED LEVEL GAUGE

FIELD OF THE INVENTION

The invention relates generally to level gauging, and more specifically to a bottom reflector for a radar-based level gauge.

BACKGROUND OF THE INVENTION AND RELATED ART

Radar-based methods are since several years extensively used for level gauging in various tanks. In such level gauging a distance from the top of a tank to a surface of a liquid stored in the tank is measured by means of transmitting microwaves towards the surface of the liquid, receiving the microwaves as reflected against the surface of the liquid, and calculating the level of the liquid in the tank from the propagation time of the transmitted and reflected microwaves.

An intrinsic limitation of radar-based level gauging is that many liquids are at least to some extent transparent to the microwaves used, which may possibly cause microwaves reflected from the bottom of the tank to interfere with the microwaves reflected from the surface of the liquid when measuring low liquid levels, i.e. the distance resolution may be insufficient to distinguish the microwaves reflected from the bottom of the tank from those reflected from the surface of the liquid. This, microwaves reflected from the bottom of the tank are likely to disturb the measurement at low liquid levels. Depending on the type of radar level gauge this problem may arise at levels below a few tenths of a meter. This is a particularly common problem in tanks having a flat bottom, which comprise liquids like petroleum products, which are at least slightly transparent.

In some tanks the bottom may be inclined. In such tanks there is typically no problems of interfering radar echoes, but on the other hand no microwaves reflected from the bottom of the tank are received when the tank is empty as the radar beam is deflected away from the receiver of the level gauge. If the tank is empty it is desirable to have a reasonably strong radar echo from the bottom in order to establish such condition. In other cases there may be an unknown layer of sludge on the bottom of the tank causing even a flat bottom to give an ambiguous radar echo or no radar echo at all.

The problem of not receiving bottom radar echoes in empty tanks may be solved by having a simple reflecting structure welded on the bottom of the tank. However, such a reflecting structure will cause interferences at liquid levels slightly above the reflecting structure provided that the liquid in the tank is at least partially transparent to the microwaves.

SUMMARY OF THE INVENTION

A main object of the invention is thus to provide a bottom reflector for a radar-based level gauge aimed for measurements of the level of a liquid in a tank, which bottom reflector reduces the interference from microwaves reflected from the bottom of the tank when using the gauge for level measurement at low liquid levels, but still provides for a satisfactory refection of the microwaves when the tank is empty.

In this respect there is a particular object of the invention to provide such a bottom reflector, which is suitable to be used whether the level is gauged through a pipe or not.

A further object of the invention is to provide such a bottom reflector, which is suitable to be used irrespective of whether the radar-based level gauge may be a frequency modulated continuous wave (FMCW) radar apparatus, a pulsed radar apparatus, or any other type of distance measuring radar.

A still further object of the invention is to provide such bottom reflector, which is simple, reliable, efficient, accurate, precise, easy to manufacture and install, and of low cost.

These objects, among others, are attained by bottom reflectors as claimed in the appended patent claims.

The inventor has found that by providing a bottom reflector, which is mountable at a predetermined height in the tank, preferably close to the bottom of the tank, for reflecting the microwave signal when no or only very levels of liquid is present in the tank, and comprises a reflecting structure, which has a first reflection coefficient for the microwave signal when the level of the liquid is above the reflecting structure and a second reflection coefficient for the microwave signal when the level of the liquid is below the reflecting structure, wherein the first reflection coefficient is substantially lower than the second reflection coefficient, the above objects can be attained.

Preferably, the liquid is an oil product such as e.g. crude oil, a liquid petroleum gas (LPG), a liquid natural gas (LNG), other liquid hydrocarbons, or liquids in general which are at least partly transparent to microwaves. Such products have typically a dielectric constant in the range 1.6–3, whereas the atmosphere above the level has typically a dielectric constant in the range of 1–1.03 depending on the contents and pressure thereof.

Still preferably, when the level of the liquid is above the reflecting structure the microwave signal reflected from the reflecting structure is weaker, advantageously much weaker, than the microwave signal reflected from the level of the liquid. When the level of the liquid is below the reflecting structure the microwave signal reflected from the reflecting structure is preferably comparable to, or slightly stronger than, the microwave signal reflected from the level of the liquid.

Various reflecting structures can be used for obtaining the desired functionality based on the differences in dielectric constant of the liquid and the atmosphere there above. These reflecting structures are described in detail in the present description and can be grouped into different groups of preferred embodiments: cut-off grids, resonant structures such as dipoles, dielectric reflectors, polarization turning structures, microwave guiding structures bendable over a small distance for guiding the transmitted and reflected microwave signal, and structures particularly applicable when free space propagation of the microwaves is used.

With respect to the group of polarization turning structures it shall be appreciated that the microwave signal as used in the level gauging has a specified polarization state and that the first and second reflection coefficients are given for that specified polarization state. Thus, the effect of rotating the polarization of a linearly polarized microwave signal at reflection in the liquid is equivalent to decreasing the reflection coefficient for the microwave signal in its specified polarization state.

A main advantage of the present invention is that level gauging can be performed without any interference from microwaves reflected from the bottom of the tank. When the tank is empty, or nearly empty, i.e. when the reflecting structure of the bottom reflector is raised above the level of the liquid gauged, a distinct reflex from the bottom reflector is obtained, which is an indication of the empty tank or the low liquid level.

The radar-based level gauges are used to measure levels in tanks, which for the purpose of the present invention include not only large containers but also processing apparatuses such as, for example, reactors, centrifuges, mixers, hoppers, graders, or heat-treatment furnaces and similar devices, which are used in food chemistry, pharmaceutical chemistry, biochemistry, gene chemistry and petrochemistry.

Further characteristics of the invention, and advantages thereof, will be evident from the detailed description of preferred embodiments of the present invention given hereinafter and the accompanying FIGS. 1–7, which are given by way of illustrated only, and thus are not limitative of the present invention.

DESCRIPTION OF PREFERRED EMBODIMENTS

Figure 1:
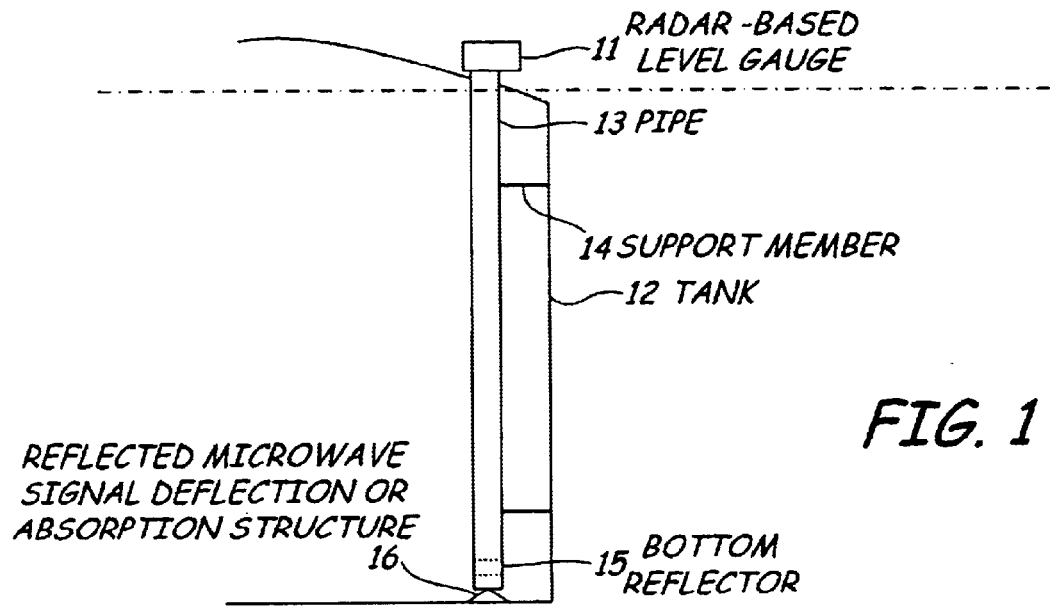
FIG. 1 illustrates schematically, in a side view, a radar-based level gauge including a bottom reflector according to the general principles of the present invention.

With reference to FIG. 1, which schematically illustrates, in a side view, an apparatus aimed for radar-based level gauging, a preferred embodiment of the present invention will be described. The apparatus may be a frequency modulated continuous wave (FMCW) radar apparatus, a pulsed radar apparatus, or any other type of distance measuring radar.

Many frequencies can be used for radar level gauging but bands close to 5.8, 10 and 25 GHz have been used extensively. In tanks where foam and contamination are frequent the lowest one of said frequencies is most common since the microwave signal at this frequency is much less sensitive for such degradations.

The radar-based level gauge, denoted by 11 in FIG. 1, is mounted above an opening of a roof of a tank or container 12 filled with a liquid, the level of which being to be gauged. Preferably, the liquid is an oil product such as e.g. crude oil, a liquid petroleum gas (LPG), or a liquid natural gas (LNG). Such products have typically a dielectric constant in the range 1.6–3, whereas the atmosphere in the tank 12 above the liquid level has typically a dielectric constant in the range of 1–1.03 depending on the gas content and pressure.

The radar-based level gauge transmits a microwave signal towards the surface of the liquid in the tank 12, and receives the microwave signal as reflected against the surface of the liquid in the tan 12. Further, the radar-based level gauge comprises, or is connected to, a signal processing device (not explicitly illustrated) for calculating from the propagation time of the transmitted and reflected microwave signal the level of the liquid in the tank. Typically, a substantially vertical pipe 13 is provided for guiding the transmitted and reflected microwave signal. The pipe 13 is attached to the tank by support members 14 and is performed in order to obtain the same liquid level inside and outside of it regardless of possible density stratifications. However, the level gauge may operate in free space propagation mode and then the pipe 13 may be dispensed with.

A bottom reflector 15 is provided near the bottom of the tank 12 for reflecting the microwave signal when no liquid is present in the tank. If a pipe is used for wave guiding, such as the pipe 13 in FIG. 1, the bottom reflector 15 is typically mounted in the lower end portion of the pipe. Alternatively, the bottom reflector is mounted at the bottom of the tank.

According to the present invention, the bottom reflector 15 comprises a reflecting structure (not explicitly illustrated in FIG. 1), which has a first reflection coefficient for the microwave signal when the level of the liquid is above the reflecting structure and a second reflection coefficient for the microwave signal when the level of the liquid is below the reflecting structure, wherein the first reflection coefficient is substantially lower than the second reflection coefficient.

By such provisions a proper operation without interference from microwaves as reflected from the bottom, can be safeguarded. This is particularly important when measuring low liquid levels in the tank 12. When the level of the liquid falls below the reflecting structure of the bottom reflector 15 a considerably stronger reflex is obtained, by which the low level is indicated.

It shall be noted that the first and second reflection coefficients are advantageously so-called in-polarization reflection coefficients. By in-polarization reflection coefficient is meant the ratio of the microwave signal (i.e. amplitude thereof) in a specified polarization state as reflected at the surface of the bottom reflector and the incident microwave signal (i.e. the amplitude thereof), where the specified polarization state is given by the polarization of the microwave signal as reflected at the surface of the fluid. Thus, given a linear polarization of the incident microwave signal the specified polarization is that linear polarization state since a linearly polarized microwave signal does not change its polarization state when being reflected by the surface of the fluid. Given a left hand circularly polarized incident microwave signal the specified polarization is right hand circular polarization since the rotation of the electric field is reversed as the microwave signal is reflected by the surface of the fluid.

Advantageously, when the level of the liquid is above the reflecting structure the microwave signal reflected from the reflecting structure is weaker, advantageously much weaker, than the microwave signal reflected from the level of the liquid. When the level of the liquid is below the reflecting structure the microwave signal reflected from the reflecting structure is preferably comparable to, or slightly stronger than, the microwave signal reflected from the level of the liquid. A too strong reflection should be avoided.

Preferably, the first reflection coefficient is lower than 0.2, more preferably lower than 0.1, and still more preferably lower than 0.05. The second reflection coefficient is preferably higher than 0.1, and more preferably higher than 0.2. Further, the second reflection coefficient is preferably lower than 0.5, more preferably lower than 0.4, and most preferably lower than 0.3.

In most cases it is preferred to deflect or absorb the reflected microwave signal as reflected from the bottom of the tank 12 by a structure 16, which can be an inclined plate, a conical surface, a piece of radar absorbing material etc.

In the following section various specific embodiments of the inventive bottom reflector are described in detail.

Specific Preferred Embodiments

FIGS. 2a–e illustrate various bottom reflectors based on the principle of waveguide cut-off frequency. Each bottom reflector comprises a grid structure having a grid separation of slightly less than $\lambda/2$, where $\lambda$ is the vacuum wavelength of the microwave signal, to prevent the microwave signal from being transmitted when the grid structure is above the level of the liquid, and instead the microwave signal is reflected. As the liquid level rises above the grid structure, the wavelength of the microwave signal is described due to the higher dielectric constant of the liquid. Thus, the grids look wider to the microwave signal and the microwave signal can pass through the grid structure.

Figure 2A:
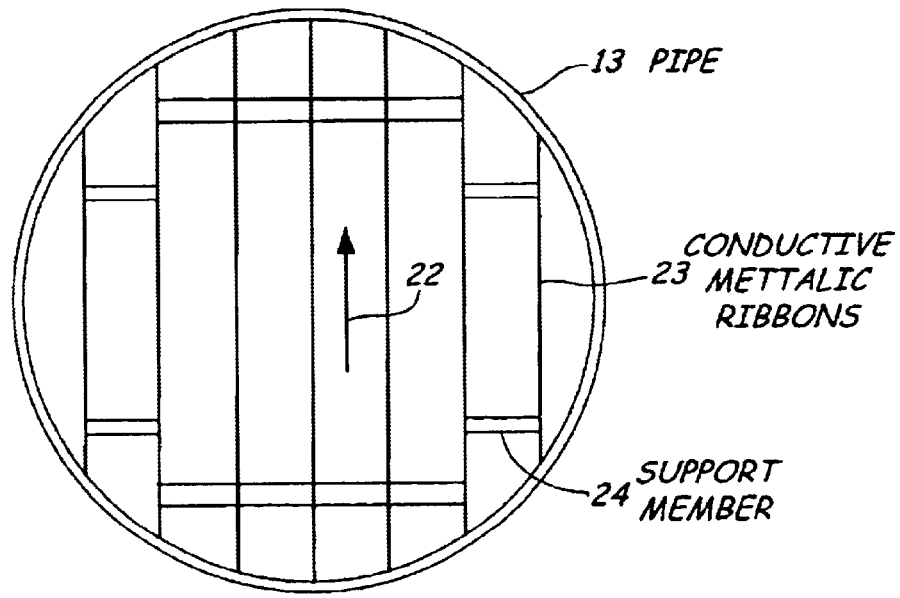
FIGS. 2a–e illustrate schematically, in top (FIGS. 2a–b) and cross-sectional side (FIGS. 2c–e) views, bottom reflectors according to a first preferred specific group of embodiments of the present invention.

In FIG. 2a is shown a bottom reflector comprising a grid structure arranged within the pipe 13. The pipe 13 is in this case arranged to support a microwave propagating in the $H_{11}$ mode with the direction of the electric field essentially as indicated by arrow 22. The grid structure consists of a plurality of conductive preferably metallic ribbons 23 with a separation slightly below $\lambda/2$ causing the propagating to be cut-off when the liquid level is below the grid structure.

At for instance 10 GHz the spacing may be 14 mm and the ribbons 23 may have a height of 28 nm, which thus corresponds to a distance of $\lambda_n/2$ in the waveguide formed by the ribbons, where $\lambda_n$ is the wavelength of the microwave signal in the liquid (i.e. when the liquid level is below the grid structure) in the pipe 13. The ribbon height of $\lambda_n/2$ causes the propagating to be free from reflection within a certain frequency band like a standard radar radome. Subsequently $\lambda_n$ will be used for the local wavelength in the pipe 13 and it shall be appreciated that $\lambda_n$ thus will be different in different contexts of the present description.

Support members 24 made from metal or some dielectric material are used to support the grid structure. FIG. 2a shows a grid structure with straight ribbons, but they may be bent to fit the electrical field pattern of the waveguide mode $H_{11}$. Further, the grid structure may be modified to match other waveguide propagation modes.

In one embodiment a bottom reflector of the present invention is provided with a mesh grid structure. Another modification is that portions of the ribbons can be made of attenuating material, which may decrease both reflection band transmission and increase the usable bandwidth.

Figure 2B:
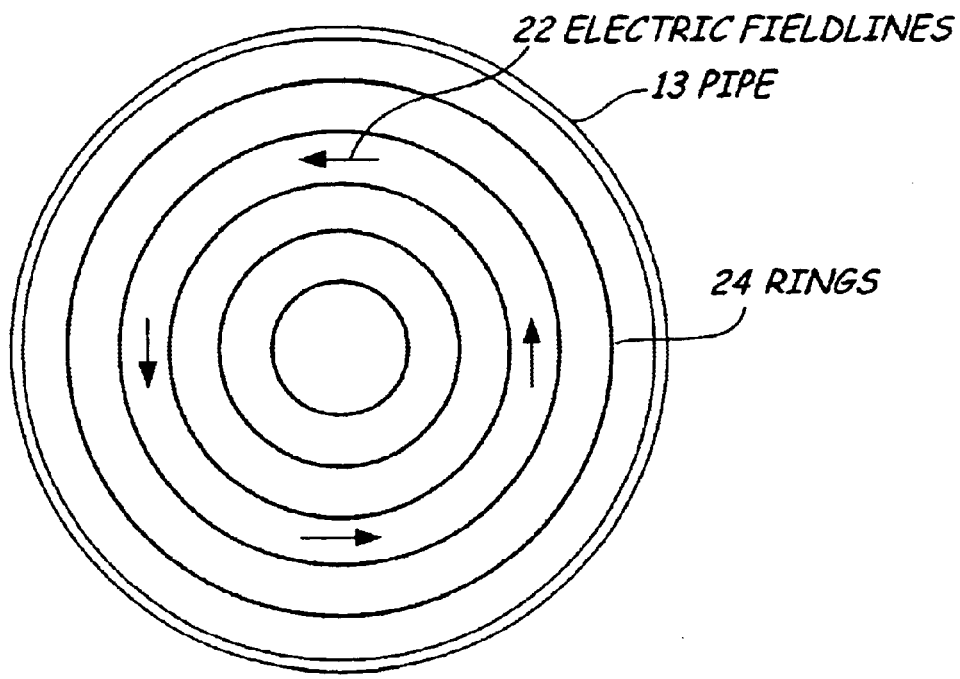

In another embodiment, as being illustrated in FIG. 2b, a grid structure including a plurality of circular conductive strips arranged concentrically within the pipe 13 is used to obtain the corresponding operation for the $H_{01}$ mode of propagation. The electric field lines 22 of the $H_{01}$ waveguide mode are purely circumferential and thus a number of concentric short cylindrical pipes or rings 25 are arranged parallel with the electric field lines. Referring to the 10 GHz example, the distance between the rings are about 14 mm but modified according to the cylindrical waveguide pattern of the $H_{01}$ mode and the height is about 28 mm. Support elements (not illustrated) of dielectric or metallic material are included in a practical implementation. Analogous to the $H_{11}$ and $H_{01}$ cases constructions for other waveguides modes are possible.

For instance, for a microwave signal in $E_{01}$ mode the ribbons should be arranged radially.

Figure 2C:
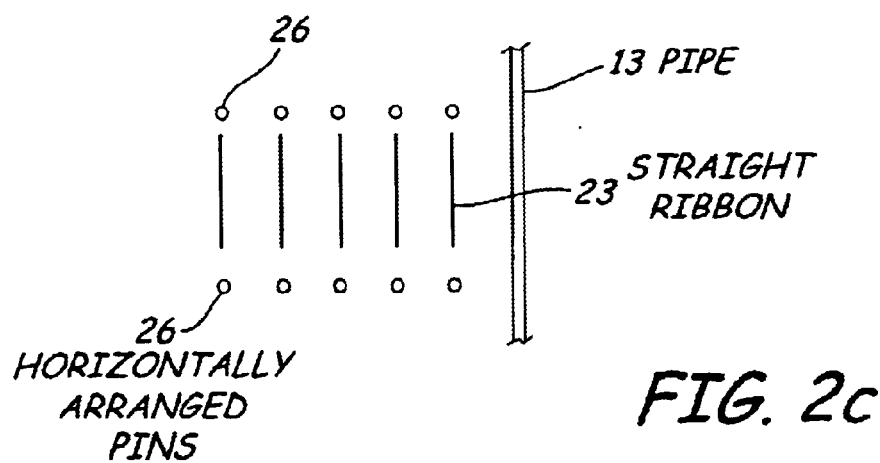

In FIG. 2c is illustrated a portion of a bottom reflector in a cross-sectional side view. This embodiment is similar to the embodiment of FIG. 2a—the straight ribbons 23 are indicated. However, this embodiment is further provided with anti-reflex structures comprising horizontally arranged pins 26 parallel with the ribbons 23. The pins 26 are located above and below the ribbons and approximate $\lambda/4$ from them. Analogous to corresponding details of radar radomes there are a number of alternatives to obtain a similar function to increase the usable ranges of frequency and of liquid dielectric constant, which is readily appreciated by the person skilled in the art.

As the transparency of the bottom reflector when immersed in the liquid exists also in the opposite direction measures have to be taken—if the bottom of the tank is flat or close to flat—in order to avoid that reflections at the bottom of the tank can be coupled back into the pipe 13 and interfere with the reflections from the surface of the liquid. Various alternatives are possible: the microwaves as transmitted through the bottom reflector may be deflected or absorbed.

Figure 2D:
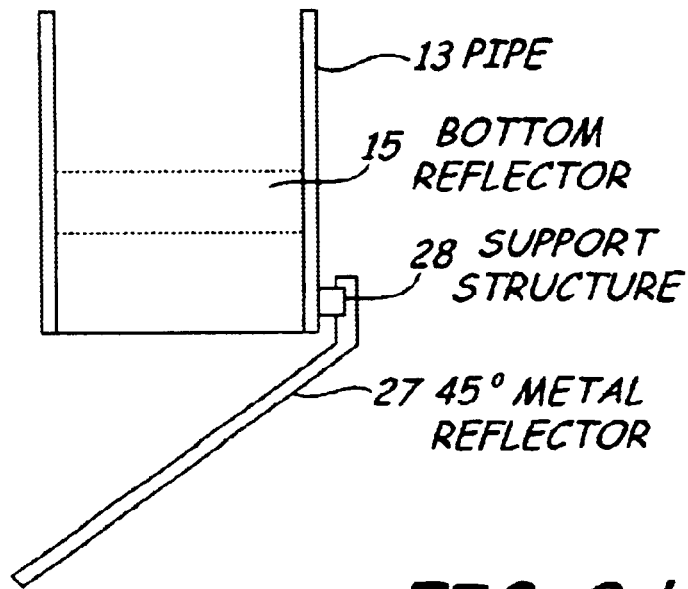

In FIG. 2d is illustrated a 45° degree metal reflector 27 mounted below a bottom reflector 15 in the pipe 13. The reflector is by means of a support structure 28 attached to the pipe 13 or to the bottom of the tank (not illustrated).

Depending on the shape of the tank a similar deflection reflector (here named deflector) may be used with all bottom reflector embodiments of the present invention. The angle can be very different from 45° and obstacles of very different shape can also be used to spread out the radar wave to prevent it from entering the pipe 13 again.

A conical part attached to the bottom or to the pipe is another usable deflector embodiment. Such part is indicated by reference numeral 16 in FIG. 1.

Figure 2E:
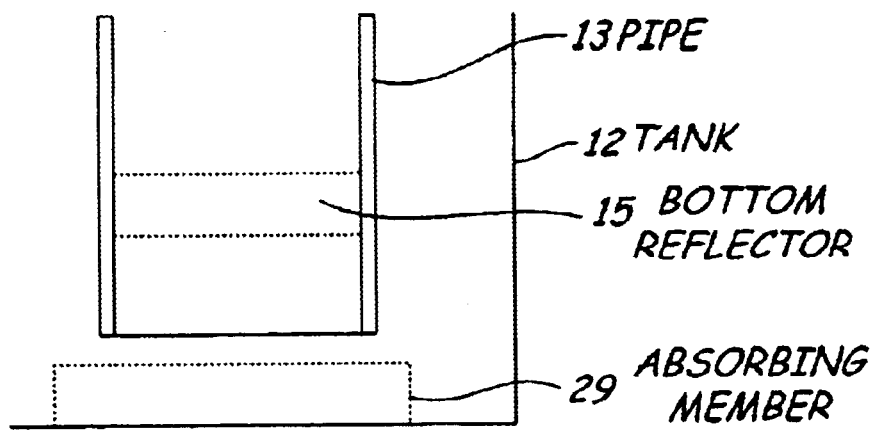

In FIG. 2e is illustrated a suitably shaped member 29 of attenuating material, such as e.g. a member of carbon filled PTFE, arranged at the bottom of the tank below the bottom reflector 15 in the pipe 13 to obtain a low reflection at the bottom. The member 29 is shown by dashed lines to indicate that the actual shape may be very different from the box-like shape as illustrated. For instance, the member may be shaped as a standard anechoic absorber.

While FIG. 2e shows the bottom reflector 15 mounted in the pipe 13, the bottom reflector may alternatively be integrated with the deflecting or absorbing member 29. Such bottom reflector design will give a true reflection from the bottom of the tank, rather than from a lower portion of the pipe 13. Some of the bottom reflectors described here are quite small (one or two λ/2 dipoles), which obviously will make such integration simple and straightforward.

Figure 2F:
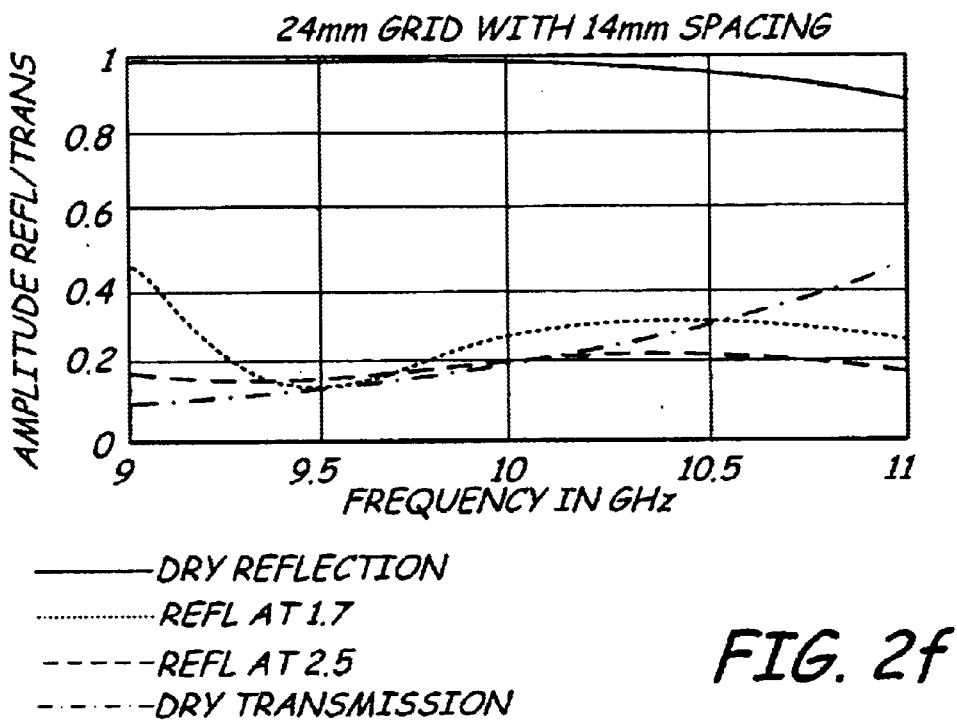
FIG. 2f is a schematic diagram of the amplitude of a microwave signal as reflected and as transmitted, respectively, by a bottom reflector according to the first preferred specific group of embodiments as a function of frequency.

FIG. 2f is a reflection diagram showing reflection in dry and immersed conditions, i.e. when the level of the liquid is above and below, respectively, the reflecting structure of the bottom reflector, for different frequencies and for different dielectric constants (1.7 and 2.5) of the liquid. Also, the transmission is shown in the dry condition.

The solid line shows the near total reflection due to the cut-off condition when the grid is in air and the dash/dotted line shows the corresponding transmission through the λ/2 grid. The dotted line shows the small reflection at the lowest dielectric constant and the dashed line shows the corresponding reflection at the highest dielectric constant within the used range of dielectric constant values. With a dielectric constant in the middle of the range the reflection is lower. Further, the reflection is fairly constant over a rather large frequency range, i.e. 9.5–10.5 GHz.

FIGS. 3a–e illustrate various bottom reflectors based on the principle of resonant structures. Each bottom reflector comprises a resonant structure including e.g. a number of dipoles tuned to be resonant in dry condition to give a distinct reflex when the tank is empty. As the resonant structure is immersed in the liquid the dipoles are tuned out of resonance and the reflection decreases considerably.

Figure 3A:
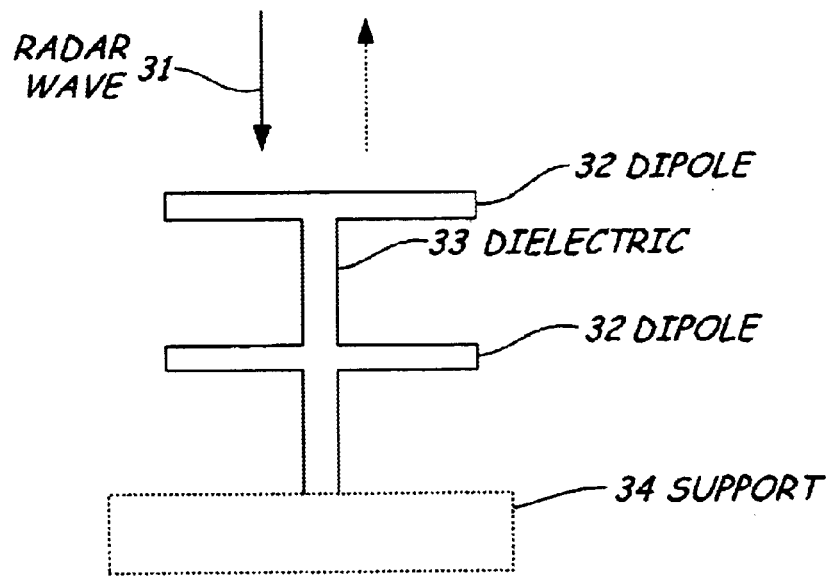
FIGS. 3a–e illustrate schematically, in side (FIG. 3a), perspective (FIG. 3b) and top (FIGS. 3c–e) views, bottom reflectors according to a second preferred specific group of embodiments of the present invention.

In FIG. 3a is illustrated a bottom reflector comprising two stacked dipoles 32. The two dipoles 32 are tuned to give maximum reflection approximately when the dielectric constant of the surrounding medium is very close to 1 (i.e. air or gas) while the vertical distance between them is chosen to be close to a quarter of a wavelength ($\lambda_n/4$) in a typical liquid, which may have a dielectric constant of 2.1. These design constraints will give the desired reflection conditions of the radar wave 31 as shown in the diagram in FIG. 3f. The dipoles 32 are attached to a vertical support pin 33, which may be of metal or a dielectric. If the vertical support pin 33 is of metal the complete structure 32, 33 can be stamped out of the same piece of plate (as being indicated in FIG. 3a). The structure 32, 33 is attached to some support 34 on or above the bottom. The dipole length may typically be slightly below 14–15 mm at 10 GHz.

Figure 3B:
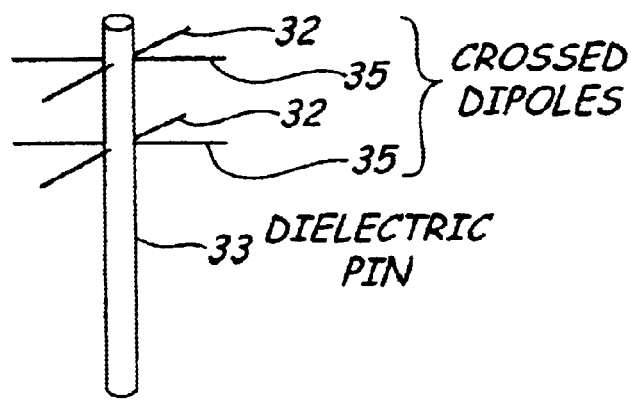

In FIG. 3b is shown a bottom reflector including an element with dual crossed dipoles 32, 35 to achieve a polarisation independent function. Except of the dipoles 32 indicated in FIG. 3a, two crossed dipoles of the same length 35 are provided. The crossed dipoles are preferably not connected and FIG. 2c indicates a mounting on a dielectric pin 33.

Figure 3C:
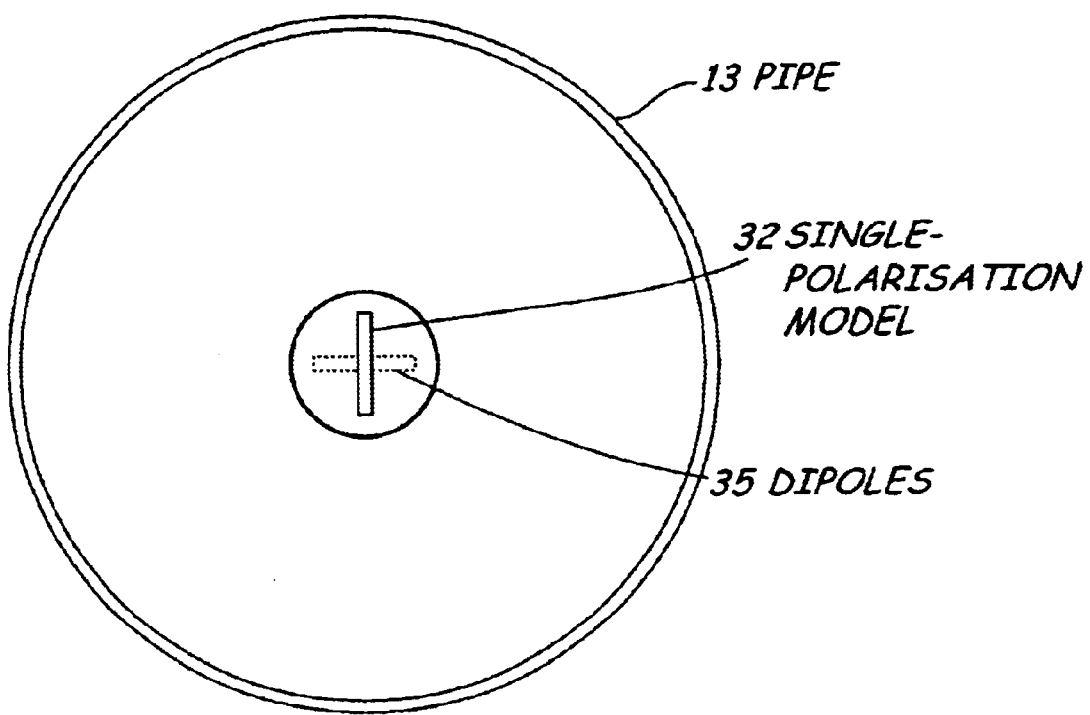

In FIG. 3c a reflecting structure like the FIG. 3a or the FIG. 3b embodiment is mounted in the middle of the pipe 13. For the $H_{11}$ mode the resonant reflector can be mounted in the middle of the waveguide pipe 13. Either the single-polarisation model 32 can be used if the polarisation is well known or the optional dipoles 35 can be added to make the reflector independent of the polarisation.

Figure 3D:
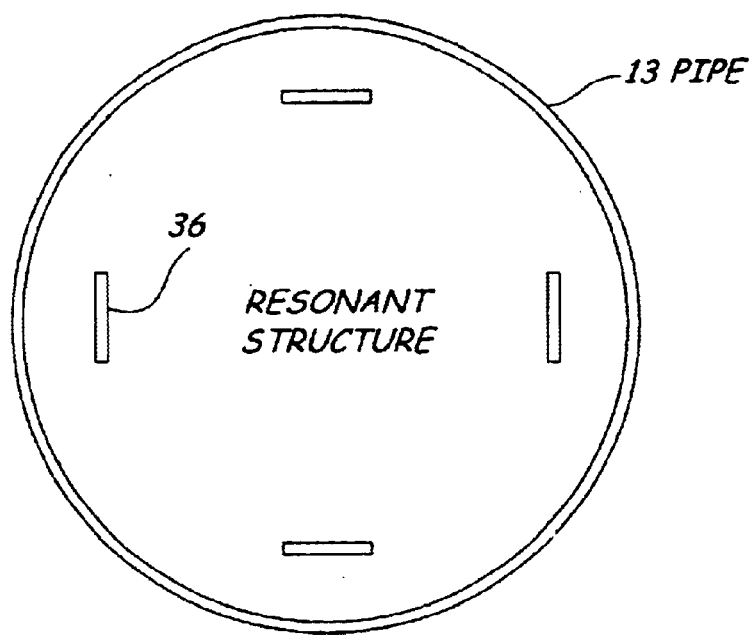

For many waveguide modes the transversal electrical field is low in the middle. This case can be covered by using a number of resonant structures, typically like the one shown in FIG. 3a. In FIG. 3d is shown such embodiment in the pipe 13. With two to four resonant structures located according to the field pattern of the mode of the microwave signal, a mode specific reflection can be obtained. The FIG. 3d embodiment is particularly suitable for use with a microwave signal in $H_{01}$ propagation mode.

Figure 3E:
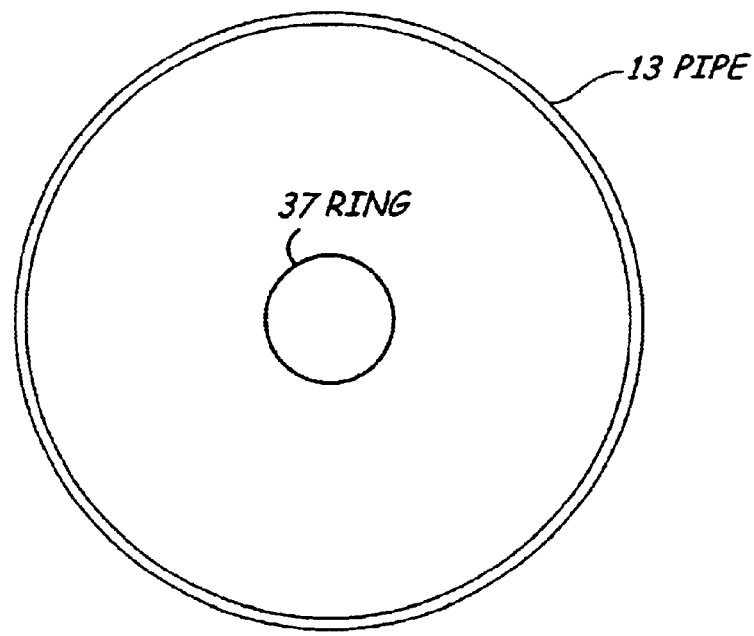

Another manner of obtaining the resonant structure for the $H_{01}$ mode is to locate a ring 37 in the middle of the pip 13 like the arrangement in FIG. 3e. The ring 37 has a resonance when it under dry conditions is one wavelength in circumference (or an integer number of wavelengths). This resonance is shifted under wet conditions. Two or more rings can be stacked like the dipoles in FIGS. 3a–b. Due to the small field in the middle of a pipe 13 carrying the $H_{01}$ mode, the reflection will be much lower than that obtained by the embodiment shown in FIG. 3d, which may be advantageous for liquids having a low reflection such as e.g. some liquid gases.

This embodiment is applicable also for microwaves propagating in other modes than $H_{01}$. For microwaves in $H_{11}$ mode, the ring shape will for instance make the reflection polarisation independent and may be used as an alternative to the crossed dipole embodiment.

Figure 3F:
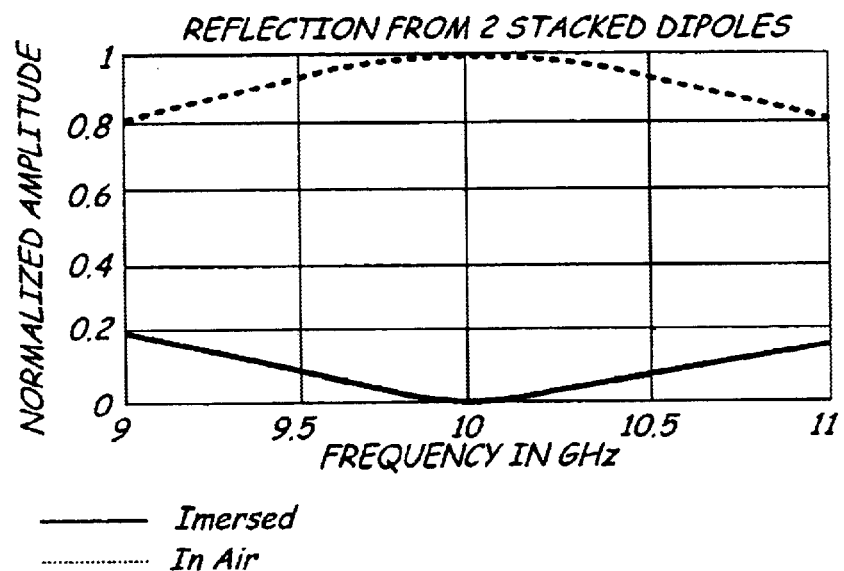
FIG. 3f is a schematic diagram of the amplitude of a microwave signal as reflected and as transmitted, respectively, by a bottom reflector according to the second preferred specific group of embodiments as a function of frequency.

FIG. 3f shows the reflection for a dipole structure consisting of two dipoles vertical stacked at a distance corresponding to $\lambda_n/4$ when immersed in a typical liquid ($\epsilon=2.1$ in this case). The length of the dipoles corresponds approximately to maximum reflection when the dipoles are dry (i.e. when they are slightly shorter than λ/2). For a typical bandwidth the reflection in immersed condition is at least 20 dB weaker than in air (or the surrounding gas). This figure should be compared to the strongest reflection (under dry conditions), which typically is 10–20 dB below that of a metal surface. The reduction of the reflection under immersed conditions is a result both of the detuning of the dipoles and the vertical spacing making the two dipoles to cancel each other. Thus, this dipole combination gives a reflection similar to an oil surface in dry condition and a considerably lower under immersed condition. More than two dipoles can be stacked to give a more wideband suppression of the radar echo in immersed condition and other resonant structures than dipoles can be used.

Figure 4A:
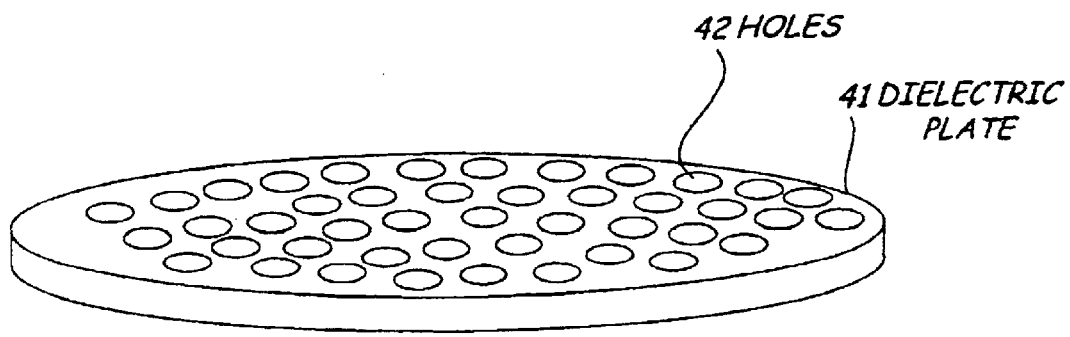
FIGS. 4a–b illustrates schematically, in perspective (FIG. 4a) and side (FIG. 4b) views, bottom reflectors according to a third preferred specific group of embodiments of the present invention.
Figure 4B:
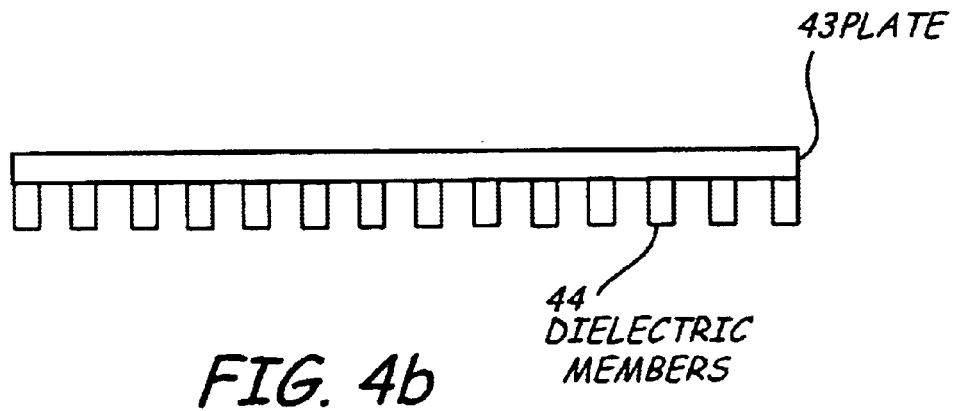

FIGS. 4a–b illustrate various bottom reflectors based on a principle related to dielectric radar radomes.

In FIG. 4a a dielectric plate 41 is illustrated, the plate 41 having a plurality of holes 42, preferably through holes (in contrast to a typical radome). The thickness of the plate 41 and the volume the holes as compared with the volume of the plate are selected such that the plate 41 when being below the surface of the liquid obtains an effective thickness of $\lambda_n/2$, where $\lambda_n$ here refers to the wavelength of the microwave signal in the dielectric having its holes filled with liquid, to minimize the reflection. In dry condition the effective dielectric constant of the plate 41 is changed and thus its thickness as experienced by the microwave signal is changed. Thus, the reflection is increased as the half-wavelength condition is not longer fulfilled.

Another suitable geometry to achieve a similar inhomogeneous behaviour is a plate made of horizontally arranged dielectric bars or pins.

Still another a reflecting structure based on a flat, but rather thin plate 43 fitted with small dielectric members 44 on its bottom side is illustrated in FIG. 4b. The flat upper side will then make it easier to make accurate reference measurements by traditional mechanical means.

Figure 4C:
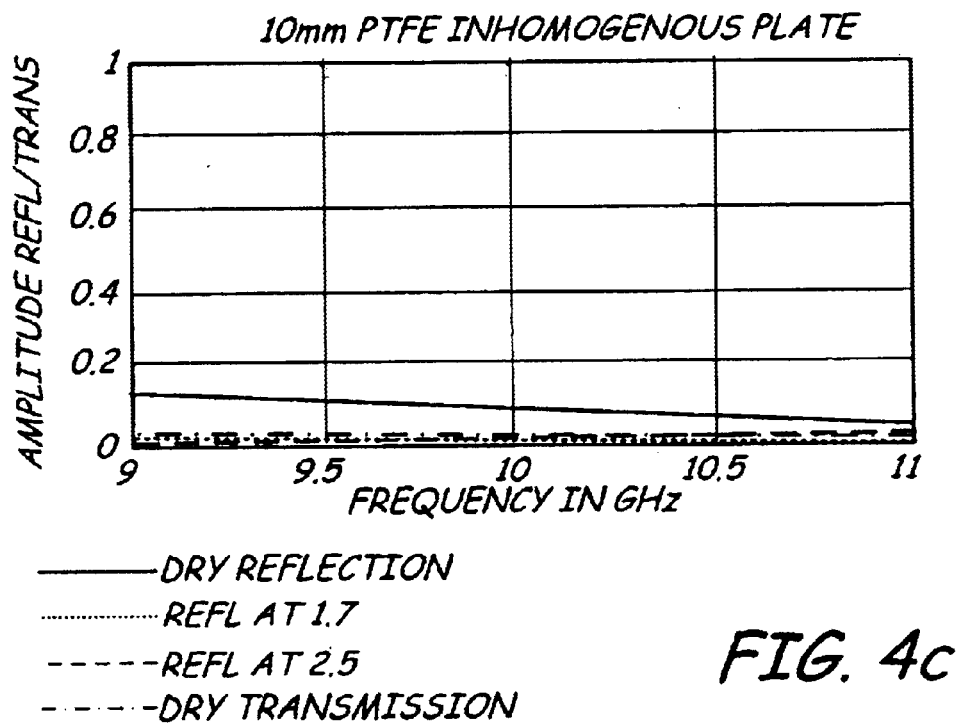
FIG. 4c is a schematic diagram of the amplitude of a microwave signal as reflected and as transmitted, respectively, by a bottom reflector according to the third preferred specific group of embodiments as a function of frequency.

FIG. 4c is a reflection diagram for partially filled dielectric plate, i.e. the plate illustrated in FIG. 4a, over a typical frequency range. The dielectric plate is in this example of PTFE plate perforated to 50%, i.e. half the volume is PTFE and half is empty. In dry condition the average dielectric constant is the average of that of PTFE and air (gas) and under immersed conditions the average dielectric constant is the average of that of PTFE and the liquid. In immersed condition the thickness is very close $\lambda_n/2$ in the middle of the band reducing the reflection considerable but under dry conditions a certain reflection is desired which is achieved as the effective electrical thickness deviate significantly from $\lambda_n/2$.

In all these cases discussed with reference to FIGS. 4a–c the exact shape of the voids to be filled with liquid is not very important. As is readily seen by those skilled in the art, portions of the dielectric material can be made of attenuating material (such as carbon loaded PTFE), which makes both the reflection and transmission lower.

Figure 5A:
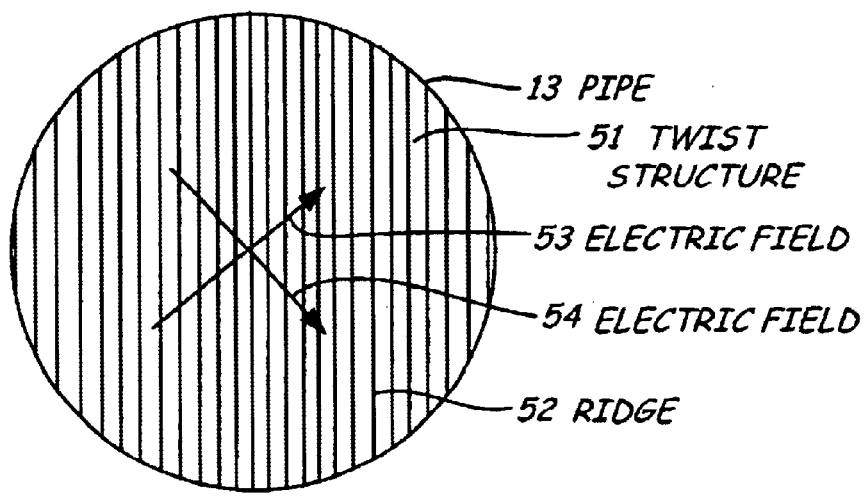
FIGS. 5a–c illustrate schematically, in top (FIGS. 5a and 5c) and cross-sectional side (FIG. 5b) views, bottom reflectors according to a fourth preferred specific group of embodiments of the present invention.
Figure 5B:
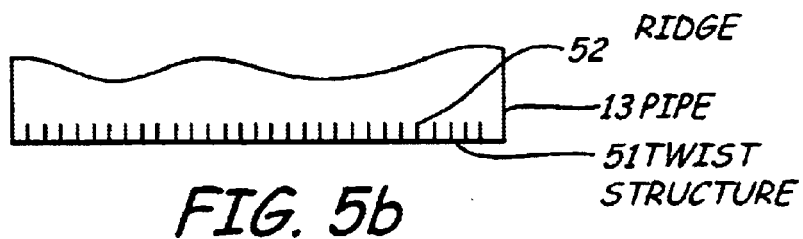
Figure 5C:
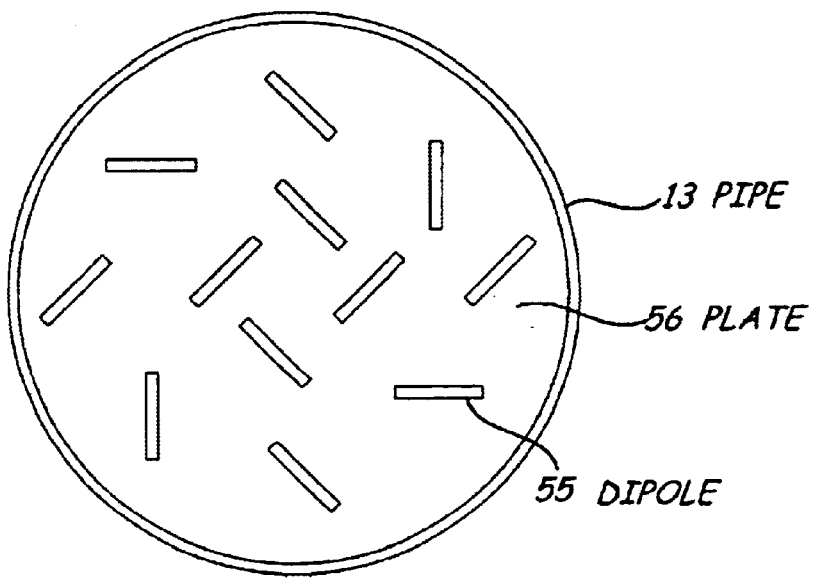

FIGS. 5a–c illustrate various bottom reflectors based on the principle of polarization turning structures.

In FIGS. 5a–b is shown a reflector known as twist reflector in antenna engineering, see *The handbook of antenna design,* Volumes 1 and 2, editors A. W. Rudge et al., Peter Peregrinus Ltd., 1986, pages 184–185, and *Antenna Engineering Handbook,* Third edition, editor R. C. Johnson, McGraw-Hill, Inc., 1993, pages 17–28–17–29, the text passages of which being hereby incorporated by reference.

The twist structure 51 comprises multiple straight and parallel ridges 52 and is of conductive material. Preferably, it is a metal plate, which may be cast to obtain the multiple ridges. The ridges are close to $\lambda_n/4$ high and have a spacing of $\lambda_n/4$–$\lambda_m/2$ when the liquid is above the ridges 52 of the reflector 51. The reflector 51 may be located at a lower end portion of the pipe 13, and the thin ridges 52 are in this configuration directed 45° from the average electric field 53 of the incoming microwave signal propagating in $H_{11}$ waveguide mode.

To understand the twist function the incoming field can be thought of as a superposition of two fields directed –45° and +45° as compared to the field lines 53. One of this fields is parallel to the ridges 52 and will be reflected from the top of the ridges 52 and the other polarisation will approximate not be influenced by the ridges 52, but will be reflected from the reflector structure as exposed between the ridges 52. Due to the height of the ridges 52 of $\lambda_n/4$, a relative phase shift of 2×90°=180° will be introduced, which in turn will twist the electric field 54 of the reflected microwaves 90° relative to the electric field 53 of the incoming microwaves. This behaviour is similar to the function of the standard twist reflector in antenna engineering. However, a sharp difference is that the dielectric constant of the material filling the space between the ridges will be different depending on weather it is liquid or air/gas. Once the tank is empty the twist function will be only partial and it will be possible to obtain reflections from the reflector 51.

An important feature of this embodiment is that the reflector is very thin, and may thus be arranged very close to the bottom of the tank allowing level gauging to be performed closer to the bottom.

It shall be appreciated for those skilled in the art that a more complex structure will enable a wider tolerance for difference dielectric constants of the liquid and for different frequencies.

It shall further be appreciated that the microwave signal as used in the level gauging in the above identified embodiment has a specific polarization state and that the first and second reflection coefficients as described above and as found in the appended patent claims are given for that specified polarization state. Thus, the effect of rotating the polarization of a linearly polarized microwave signal at reflection in the liquid is equivalent to decreasing the reflection coefficient for the microwave signal in its specified polarization state.

The principle of polarization rotation is also applicable for changing the propagation mode of the reflected microwaves to another one as illustrated by FIG. 5c. The twist structure can be implemented by a spiral structure, which changes the propagation mode of the reflected microwaves for $H_{01}$ to $E_{01}$, and is described in U.S. Pat. No. 4,641,139 issued to K. O. Edvardsson, the content of which being hereby incorporated by reference. A similar function can be obtained by a number of suitably located dipoles 55 on a plate 56 made of conductive or attenuating material. This arrangement has similarities with the arrangement illustrated in FIG. 3d, but here the plate 56 is present and there are more and differently directed dipoles 55. Further, the dipoles 55 in FIG. 5c are single and not stacked.

The dipoles form a frequency sensitive surface giving a reflection comparable to that of the bottom plate 55 but with different polarisation and phase. If incident microwaves propagate in $H_{01}$ mode in the pole 13, the reflected microwaves, when the reflector is immersed in liquid and properly designed, will mainly propagate in $E_{01}$ mode. In contrast to the known frequency sensitive surface, this one will be detuned when the reflector is in dry condition, and a large amount of the reflected microwaves will propagate in $H_{01}$ mode.

Thus, a suitable design of the reflector of FIG. 5c provides for a very small reflection in the incoming waveguide mode when the reflector is immersed in the liquid, and substantially stronger reflection in the incoming waveguide mode when the reflector is in air or gas.

Depending on the material of the bottom plate, the reflection in the incoming waveguide mode may be very strong, i.e. nearly total reflection, (if the plate 55 is of metal) or may be comparable to a reflection from an oil surface (in the plate 55 is of a suitable attenuating material). As is readily seen by the person skilled in the art attenuation material can be included in anyone of the polarisation turning embodiments to adjust the reflection in dry condition.

Figure 6:
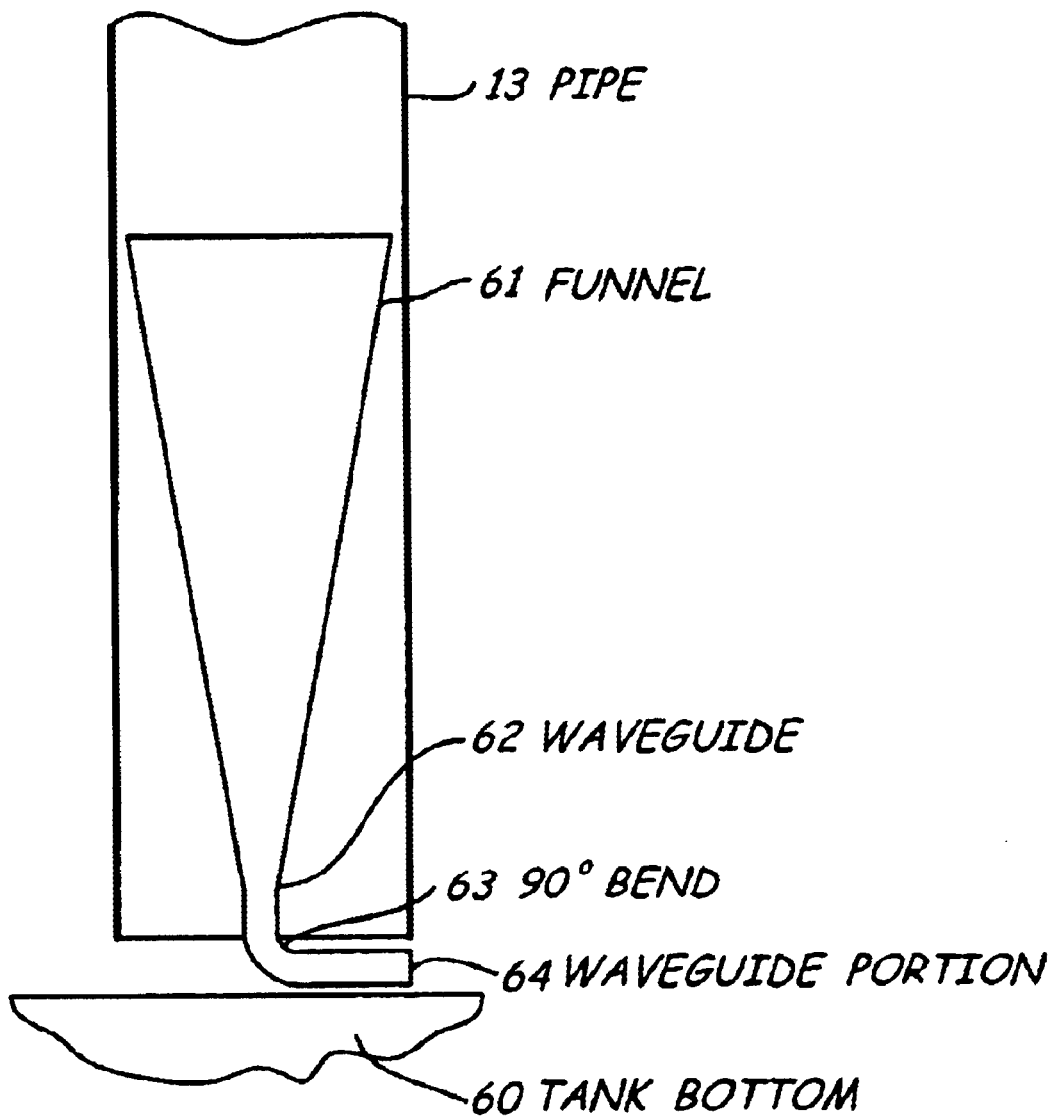
FIG. 6 illustrates schematically, in a cross-sectional side view, a bottom reflector according to a fifth preferred specific group of embodiments of the present invention.

FIG. 6 illustrates a bottom reflector based on the principle of locally decreasing the cross-sectional area of the pipe. To decrease or eliminate the radar echo from the tank bottom below the pipe 13 a device can be employed, which transfers the pipe diameter to a smaller diameter, which can be bent within a small space to direct the radar waves away from the pipe 13. One embodiment, which only employs materials suitable for mounting close to the bottom 60 of a tank (i.e. only stainless steel) is based on a funnel 61, which decreases the diameter down to a diameter close to that of a single mode waveguide. Such a waveguide 62 can easily be provided with a 90° bend 63 close above the bottom 60 in order to lead the microwaves away through a waveguide portion 64.

The waveguide portion 64 can easily be designed to give a low reflection as long as the waveguide is filled with liquid of fairly well known properties (including a range of hydrocarbons). The distance from the tank bottom 60 and the end of the pipe 13 can be made very short. The funnel 61 and waveguide can be attached to the tank bottom 60 or to the pipe 13.

If the waveguide 62 is narrow to restrict propagation to one mode when the waveguide 62 is immersed in the liquid, the propagation will be cut-off in dry condition and the empty tank will have a reflection at the bottom of the funnel 61.

An alternative to the funnel 61 is to mount a cone shaped conductive or resistive structure at the bottom of the tank with its top pointing essentially upwards within the pipe, preferably at least one pipe from the bottom end of the pipe (not illustrated). A certain space between the bottom end of the pipe and the envelope surface of the cone shaped structure is needed to obtain a smooth transition from the pipe above the cone shaped structure to the coaxial waveguide formed by the pipe together with the cone shaped structure. As the microwaves are propagating out of the bottom end of the pipe they will be deflected away form the pipe. In the coaxial waveguide formed, attenuating material may be provided. By a suitable resonant structure (such as e.g. half-wavelength slots in the coaxial waveguide) a bottom reflector may be obtained, which has a very small reflection when immersed in the liquid and a much stronger reflection in dry condition.

Figure 7:
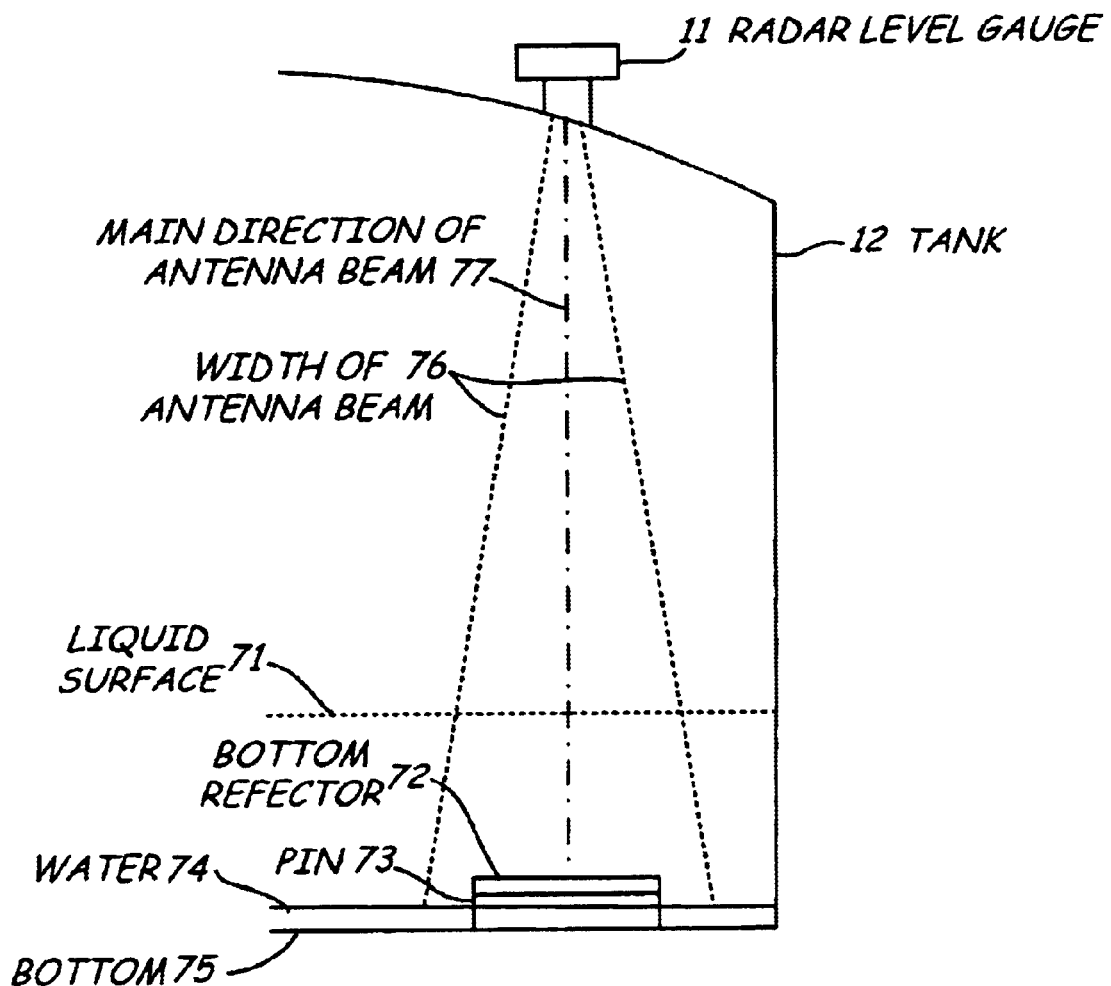
FIG. 7 illustrates schematically, in a perspective view, a bottom reflector according to a sixth preferred specific group of embodiments of the present invention.

FIG. 7, finally, illustrates a bottom reflector applicable when free space propagation of the microwaves is used, i.e. when no pipe is present for guiding the microwaves. The radar level gauge 11 is mounted at the top of the tank 12 with a main direction 77 of the antenna beam 76, which is close to vertical to be capable of receiving the reflex from the liquid surface 71. The dotted lines 76 indicate the width of the antenna beam. When the liquid surface 71 is approaching the bottom 75 interference problems are typical and similar problems will occur if there is water 74 just over the bottom 75. The position of the water level is initially not well known and it may give a stronger radar echo than the bottom 75.

When the present invention is applied to this case, a bottom reflector 72 is mounted close to the bottom on support members 73. The bottom reflector 72 can be similar to FIG. 2a but it has to be much larger. An approximate area of $\pi*[\text{square root}(h\lambda)]^2/4$ is active in the reflection, where h is the distance from the level gauge 11 to the bottom reflector 72, so the bottom reflector should have an area covering at least an essential portion of the active reflection area. Further, when the bottom reflector 72 has a structure like the one in FIG. 2a it will not accumulate any water or sludge, which is advantageous.

In a particular embodiment of the invention the bottom reflector 72 may have a smaller size. If the phase shift of the transmission through the bottom reflector 72 is controlled so that the portion of the bottom or water reflection passing through the bottom reflector 72 will cancel the portion of the reflection going outside of the bottom reflector 72. By such provisions not only the reflection from the bottom reflector 72 will be low but also the reflection from the bottom or from the water surface. The support pins 73 should be as low as possible with regard to the expected water level.

It shall be appreciated by the man skilled in the art that the principles of bottom reflection as described with reference to FIGS. 2–5 also are applicable for a level gauge, which is arranged for transmission and reception of microwaves, which are not guided by any pipe.

What is claimed is:

1. A bottom reflector for a radar-based level gauge, which measures a level of a liquid stored in a tank by means of transmitting a microwave signal towards the surface of the liquid from the top of the tank, receiving the microwave signal as reflected against the surface of the liquid, and calculating the level of the liquid stores in the tank from the propagation time of the transmitted and reflected microwave signal, said bottom reflector being mountable at a predetermined height in said tank for reflecting the microwave signal when no liquid is present at said predetermined height in the tank, wherein said bottom reflector comprises a reflecting structure having a first reflection coefficient for said microwave signal when the level of the liquid is above the reflecting structure and a second reflection coefficient for said microwave signal when the level of the liquid is below the reflecting structure, said first reflection coefficient being substantially lower than said second reflection coefficient.

2. The bottom reflector of claim 1 wherein said first reflection coefficient of said reflecting structure for said microwave signal is lower than a reflection coefficient of the surface of said liquid for said microwave signal.

3. The bottom reflector of claim 2 wherein said first reflection coefficient of said reflecting structure for said microwave signal is substantially lower than the reflection coefficient of the surface of said liquid for said microwave signal.

4. The bottom reflector of claim 1 wherein said second reflection coefficient of said reflecting structure for said microwave signal is approximately of the same magnitude as, or slightly higher than, a reflection coefficient of the surface of said liquid for said microwave signal.

5. The bottom reflector of claim 1 wherein the liquid has a dielectric constant in the range 1.6–3.

6. The bottom reflector of claim 1 wherein the liquid is a liquid in a group comprising crude oil, a liquid petroleum gas, a liquid natural gas, other hydrocarbon liquids, and liquids at least partly transparent to said microwave signal.

7. The bottom reflector of claim 1 wherein said microwave signal has a specified polarization state; and said first and second reflection coefficients are given for the microwave signal in said specified polarization state.

8. The bottom reflector of claim 1 wherein said microwave signal is within a specified frequency range.

9. The bottom reflector of claim 1 wherein said first reflection coefficient is lower than 0.2

10. The bottom reflector of claim 1 wherein said first reflection coefficient is lower than 0.1.

11. The bottom reflector of claim 1 wherein said first reflection coefficient is lower than 0.05.

12. The bottom reflector of claim 1 wherein said second reflection coefficient is higher than 0.1.

13. The bottom reflector of claim 1 wherein said second reflection coefficient is higher than 0.2.

14. The bottom reflector of claim 1 wherein said second reflection coefficient is lower than 0.5.

15. The bottom reflector of claim 1 wherein said second reflection coefficient is lower than 0.4.

16. The bottom reflector of claim 1 wherein said second reflection coefficient is lower than 0.3.

17. The bottom reflector of claim 1 wherein said reflecting structure is adapted for use in manual level gauging by means of hand dipping.

18. The bottom reflector of claim 1 wherein said level gauge comprises a substantially vertical tube, in which the transmitted and reflected microwave signal is guided.

19. The bottom reflector claim 18 wherein said bottom reflector is mountable in a lower end portion of said substantially vertical tube.

20. The bottom reflector claim 18 wherein said microwave signal has a specified mode of propagation; and said first and second reflection coefficients are given for the microwave signal in said specified mode of propagation.

21. The bottom reflector of claim 18 wherein said reflecting structure is a cut-of grid.

22. The bottom reflector of claim 21 wherein said microwave signal propagates in $H_{11}$ mode, and said cut-off grid comprises a number of essentially parallel strips arranged essentially in parallel with an electric field of said microwave signal.

23. The bottom reflector of claim 21 wherein said microwave signal propagates in $H_{01}$ mode, and said cut-off grid comprises a number of concentrically arranged circular strips arranged in parallel with an electric field of said microwave signal.

24. The bottom reflector of claim 1 further comprising a deflecting structure arranged below said reflecting structure.

25. The bottom reflector of claim 1 further comprising an absorbing structure arranged below said reflecting structure.

26. The bottom reflector of claim 18 wherein said reflecting structure is a resonant structure.

27. The bottom reflector of claim 26 wherein said resonant structure includes dipoles.

28. The bottom reflector of claim 26 wherein said resonant structure comprises stacked dipoles.

29. The bottom reflector of claim 26 wherein said resonant structure comprises duel crossed dipoles.

30. The bottom reflector of claim 26 wherein said microwave signal propagates in $H_{11}$ mode, and the resonant structure comprises a single dipole element arranged at a central axis of said substantially vertical tube.

31. The bottom reflector of claim 26 wherein said microwave signal propagates in $H_{01}$ mode, and the resonant structure comprises multiple dipole elements arranged circumferentially spaced from a central axis within said substantially vertical tube.

32. The bottom reflector of claim 26 wherein said microwave signal propagates in $H_{01}$ modes, and the resonant structure comprises a ring having an axis of symmetry which coincides with a central axis of said substantially vertical tube.

33. The bottom reflector of claim 18 wherein said reflecting structure is a dielectric reflector.

34. The bottom reflector of claim 33 wherein said dielectric reflector is a perforated plate.

35. The bottom reflector of claim 33 wherein said dielectric reflector comprises an essentially horizontally arranged plate provided with small dielectric members on its bottom side.

36. The bottom reflector of claim 18 wherein said reflecting structure is a polarization turning structure.

37. The bottom reflector of claim 36 wherein said polarization turning structure is a twist reflector structure including ridges.

38. The bottom reflector of claim 36 wherein said polarization turning structure includes a reflector and multiple differently directed dipoles.

39. The bottom reflector of claim 18 wherein said reflecting structure is a microwave guiding structure, which is arranged within said substantially vertical tube and through which the transmitted and reflected microwave signal is guided away from the interior of said substantially vertical tube.

40. The bottom reflector of claim 39 wherein said microwave guiding structure is a funnel.

41. The bottom reflector of claim 1 wherein said level gauge is adapted for free space propagation of the microwave signal.

42. The bottom reflector of claim 41 wherein said reflecting structure is a cut-off grid, a resonant structure, a dielectric reflector, or a polarization turning structure.

43. The bottom reflector of claim 41 wherein said reflecting structure covers an area, which is at least an essential portion of an area of $\pi*[\text{square root}(h\lambda)]^2/4$ below said radar-based level gauge, where h is the distance from said radar-based level gauge to said bottom reflector and $\lambda$ is the wavelength of said microwave signal.

44. The bottom reflector of claim 41 wherein the area of said bottom reflector is smaller than the area of said microwave signal at the height of the bottom reflector; and the phase shift of the microwave signal as transmitted through the bottom reflector when the level of the liquid is above said bottom reflector, is controlled so that the portions of the microwave signal as reflected from the bottom of the tank outside said bottom reflector and portions of the microwave signal as reflected from the bottom of the tank after having passed through said bottom reflector will cancel out each other.

45. The bottom reflector of claim 1 wherein said bottom reflector is mountable close to the bottom of said tank.

46. A radar-based level gauge system comprising the bottom reflector of claim 1.

47. A bottom reflector for a radar-based level gauge, which measures a level of a liquid stored in a tank by means of transmitting a microwave signal towards the surface of the liquid from the top of the tank, receiving the microwave signal as reflected against the surface of the liquid, and calculating the level of the liquid stored in the tank from the propagation time of the transmitted and reflected microwave signal, said bottom reflector being mountable close to the bottom of said tank for reflecting the microwave signal when no liquid is present in the tank, wherein said bottom reflector comprises a reflecting structure having a first reflection coefficient for said microwave signal when the level of the liquid is above the reflecting structure and a second reflection coefficient for said microwave signal when the level of the liquid is below the reflecting structure, said first reflection coefficient being lower than a reflection coefficient of the surface of said liquid for said microwave signal.

48. The bottom reflector of claim 47 wherein said second reflection coefficient of said reflecting structure for said microwave signal is approximately of the same magnitude as, or slightly higher than, the reflection coefficient of the surface of said liquid for said microwave signal.

49. The bottom reflector of claim 47 wherein the liquid has a dielectric constant in the range 1.6–3.

50. The bottom of claim 47 wherein the liquid is a liquid in a group comprising crude oil, a liquid petroleum gas, a liquid natural gas, other hydrocarbon liquids, and liquids at least partly transparent to said microwave signal.

51. A bottom reflector for a radar-based level gauge, which measures a level of a liquid stored in a tank by means of transmitting microwaves towards the surface of the liquid from the top of the tank, receiving the microwaves as reflected against the surface of the liquid, and calculating the level of the liquid stored in the tank from the propagation time of the transmitted and reflected microwaves, said bottom reflector being mountable close to the bottom of said tank for reflecting the microwaves when no liquid is present in the tank, wherein said bottom reflector comprises a reflecting structure which rotates the polarization of the reflected microwaves differently when the level of the liquid is above the reflecting structure as compared to when the level of the liquid is below the reflecting structure.

52. The bottom reflector of claim 51 wherein said reflecting structure rotates the polarization of the reflected microwaves more when the level of the liquid is above the reflecting structure than when the level of the liquid is below the reflecting structure.

53. The bottom reflector of claim 51 wherein said reflecting structure is a twist reflector structure including ridges.

54. The bottom reflector of claim 51 wherein said reflecting structure includes a reflector and multiple differently directed dipoles.

* * * * *

UNITED STATES PATENT AND TRADEMARK OFFICE
CERTIFICATE OF CORRECTION

PATENT NO. : 6,795,015 B2
DATED : September 21, 2004
INVENTOR(S) : Kurt O. Edvardsson It is certified that error appears in the above-identified patent and that said Letters Patent is hereby corrected as shown below:

Column 11,
Line 56, delete "stores" and insert -- stored --.

Column 12,
Line 57, delete "cut-of" and insert -- cut-off --.

Column 13,
Line 23, delete "modes" and insert -- mode --.

Signed and Sealed this

Sixth Day of September, 2005

JON W. DUDAS
*Director of the United States Patent and Trademark Office*